United States Patent
Bailly et al.

(10) Patent No.: US 8,307,936 B2
(45) Date of Patent: Nov. 13, 2012

(54) TRANSMISSION DEVICE FOR A VEHICLE, COMPRISING A VARIATOR, A PLANETARY GEAR UNIT AND A MANUAL TRANSMISSION UNIT

(75) Inventors: Gerhard Bailly, Friedrichshafen (DE); Thomas Ratzmann, Meckenbeuren (DE); Karl Grad, Ruderting (DE); Jurgen Pohlenz, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 126 days.

(21) Appl. No.: 13/001,051

(22) PCT Filed: Aug. 15, 2008

(86) PCT No.: PCT/EP2008/060754
§ 371 (c)(1),
(2), (4) Date: Dec. 23, 2010

(87) PCT Pub. No.: WO2010/006658
PCT Pub. Date: Jan. 21, 2010

(65) Prior Publication Data
US 2011/0100732 A1 May 5, 2011

(30) Foreign Application Priority Data
Jul. 16, 2008 (DE) .......................... 10 2008 040 448

(51) Int. Cl.
*B60K 17/00* (2006.01)
(52) U.S. Cl. ....................................... 180/374
(58) Field of Classification Search .................. 180/374; 475/18, 23, 25
See application file for complete search history.

(56) References Cited

U.S. PATENT DOCUMENTS

| 3,371,734 A | 3/1968 | Zaunberger et al. |
| 3,392,602 A * | 7/1968 | Frost ................................ 475/19 |
| 3,580,107 A | 5/1971 | Orshansky |
| 4,471,669 A | 9/1984 | Seaberg |
| 5,766,107 A | 6/1998 | Englisch |
| 6,210,298 B1 | 4/2001 | Baur et al. |
| 6,830,115 B2 * | 12/2004 | Okada et al. ................... 180/6.44 |
| 2005/0070390 A1 * | 3/2005 | Irikura et al. ...................... 475/23 |
| 2007/0281815 A1 | 12/2007 | Gollner |
| 2008/0242468 A1 * | 10/2008 | Wafzig ............................ 475/214 |
| 2010/0197437 A1 * | 8/2010 | Bailly et al. ....................... 475/31 |
| 2010/0197440 A1 * | 8/2010 | Bailly et al. ....................... 475/83 |
| 2010/0203998 A1 * | 8/2010 | Bailly et al. .................... 475/214 |

FOREIGN PATENT DOCUMENTS

| DE | 1 159 772 | 12/1963 |
| DE | 1 952 966 | 4/1970 |
| DE | 42 23 296 A1 | 1/1994 |
| DE | 100 03 174 A1 | 9/2000 |
| DE | 10 2006 025 348 A1 | 12/2007 |
| EP | 0 683 875 B1 | 4/1998 |
| JP | 2002 235831 A | 8/2002 |
| WO | 99/01681 A1 | 1/1999 |
| WO | 00/43695 A2 | 7/2000 |

* cited by examiner

*Primary Examiner* — Faye M. Fleming
(74) *Attorney, Agent, or Firm* — Davis & Bujold, P.L.L.C.

(57) ABSTRACT

A transmission device (1) for a vehicle with a variator (3), a planetary gear unit (4) and a gearshift transmission unit (9). The variator (3) has a length which is greater than a width and a depth of the variator (3). When the variator (3) is installed in position in the vehicle, the length of the variator (3) is orientated at least approximately diagonally to the length of the vehicle.

12 Claims, 6 Drawing Sheets

TRANSMISSION DEVICE FOR A VEHICLE, COMPRISING A VARIATOR, A PLANETARY GEAR UNIT AND A MANUAL TRANSMISSION UNIT

This application is a National Stage completion of PCT/EP2008/060754 filed Aug. 15, 2008, which claims priority from German patent application serial no. 10 2008 040 448.9 filed Jul. 16, 2008.

FIELD OF THE INVENTION

The invention concerns a transmission device for a vehicle, comprising a variator, a planetary gear unit and a manual transmission unit.

BACKGROUND OF THE INVENTION

A hydrostatic-mechanical tractor transmission with a continuously variable hydrostatic drive is known from DE 10 2006 025 348 A1. The hydrostatic drive comprises a hydrostatic pump powered by an internal combustion engine and a hydro-motor driven by the pump. The pump and hydro-motor are force-coupled by a single, common pivoting component and can be adjusted in such manner that the pump can pivot between a minimum angle and a maximum angle, while at the same time the motor pivots synchronously between a maximum pivot angle and a minimum pivot angle. The pump is designed to deliver a volume flow in only one direction. A mechanical range transmission with a plurality of shift steps that can be engaged by means of a clutch is connected downstream.

Furthermore, from DE 19 52 966 A a transmission device with power branching is known, which comprises a variator, a double planetary gearset and a manual transmission unit for producing a plurality of driving ranges. The pumps and motor unit of the variator made as a hydrostatic device can be adjusted by means of a common yoke.

SUMMARY OF THE INVENTION

The purpose of the present invention is to develop further the transmission devices known from the prior art in such manner that they can also be fitted into vehicles in which lateral space is restricted by a predefined frame structure and fitting space is also restricted upward by the superstructure of the vehicle and downward by a desired ground clearance, without having to redesign existing vehicle systems.

In the transmission device according to the invention for a vehicle, comprising a variator, a planetary gear unit and a manual transmission unit, such that the variator is longer than it is wide and deep, the longitudinal extension of the variator in its fitted position in the vehicle is orientated at least approximately diagonally.

In this way the transmission device according to the invention can be fitted into the structural space available in a vehicle in which lateral space is restricted by a defined frame structure and the upward and downward spaces are restricted by the vehicle superstructure and/or by a desired ground clearance, without having to modify the design of existing vehicle systems.

In an advantageous further development of the transmission device according to the invention, the variator is arranged at least partially below an oil level of the oil sump, in order to enable the variator to be dismantled in a particularly simple manner from the underside of the vehicle. In order to avoid power losses due to oil splashing on the rotating components of the variator during the operation of the transmission device according to the invention, the area of the variator below the oil level is shielded from the hydraulic fluid in the oil sump by partitioning elements.

Alternatively, in an advantageous embodiment of the transmission device according to the invention the variator is arranged above the oil level in the oil sump, to avoid splashing losses.

A further embodiment of the transmission device according to the invention is made with a variator designed as a hydrostatic device, in order to be able to transmit as much power as possible, by means of a transmission device that takes up little structural space, from a drive machine of a vehicle, through the transmission device, to a drive output of the vehicle.

An inexpensive further development of the transmission device according to the invention, which is characterized by a simple structure, is designed with a hydrostatic device comprising at least one constant unit.

In a further embodiment of the transmission device according to the invention in which the hydrostatic device comprises at least one adjustable pump device and at least one adjustable motor device which can be adjusted independently of one another, the gear ratio ranges produced by means of the variator, the planetary gear unit and the manual transmission unit, whose gear ratio is continuously variable, can be obtained with a large spread.

In an embodiment of the transmission device according to the invention alternative to the above, the hydrostatic device comprises at least one adjustable pump device and at least one motor device which can be adjusted together. In this way, compared with the previously mentioned embodiment of the transmission device according to the invention, the adjustment of the hydrostatic device is of simple design and can be produced less expensively.

In an advantageous further development of the transmission device according to the invention, in a simple manner and in relation to the planetary gear unit and the manual transmission unit the variator can be located in any desired position, since in the area of a first shaft and in the area of a second shaft the variator is connected by an angle drive in each case to a shaft of the planetary gear unit. In addition, the connection of the variator by means of angle drives has the advantage that the variator can be actively connected to the planetary gear unit and the manual transmission unit with smaller gearwheels than if the variator were connected by spur gearing.

In an advantageous further development of the transmission device according to the invention, in its fitted position the variator is arranged between a drive machine of the vehicle and the planetary gear unit and manual transmission unit. In a simple manner, this allows the variator to be removed from a vehicle by pulling it out in the forward direction if the transmission housing is not accessible from the side. Furthermore, if there is appropriate accessibility the variator can also be simply removed from underneath the vehicle with no additional dismantling of vehicle components or tilting of a vehicle cabin.

With designs of the transmission device having little structural fitting space in the radial direction, either the variator is arranged between the planetary gearset and the manual transmission unit, or the manual transmission unit is arranged between the planetary gearset and the variator.

BRIEF DESCRIPTION OF THE DRAWINGS

Further advantages and advantageous additional developments of the invention emerge from the claims and from the example embodiments whose principle is described with reference to the drawing; for the sake of clarity, in the description of the example embodiments the same indexes are used for structurally and functionally equivalent components.

The drawings show.

DETAILED DESCRIPTION OF THE PREFERRED EMBODIMENTS

Figure 1:
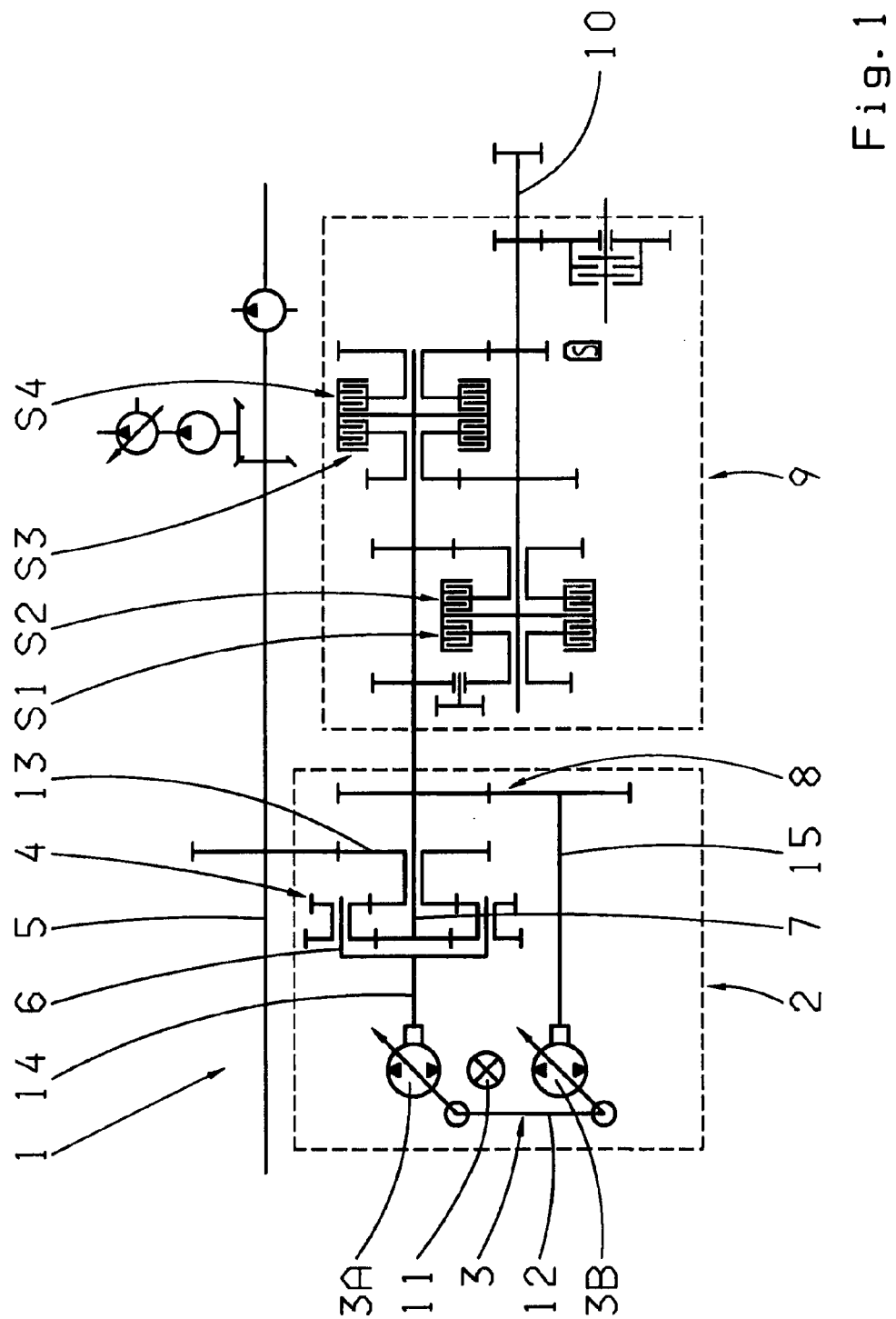
FIG. 1: Gearing layout of a first example embodiment of the transmission device according to the invention.

FIG. 1 shows a gearing layout of a transmission device 1 with continuously variable gear ratio adjustment, which can be used for example in agricultural vehicles. In this case the transmission device 1 can produce three gear ratio ranges or driving ranges for forward driving and one gear ratio range for reverse drive, within which the gear ratio of the transmission device 1 is continuously adjustable.

The continuous adjustment of the transmission gear ratio is enabled by a continuous drive unit 2 comprising a variator 3 and a planetary gear unit 4. By means of the planetary gear unit 4, the continuous speed adjustability of the variator 3 is superposed on the speed, itself only adjustable to a limited extent, of a transmission input shaft 5 coupled to a drive machine of a vehicle. As a result of this superposition, in the area of the planetary gear unit 4 two shafts 6, 7 of the planetary gear unit 4 whose speed is continuously variable are available, the first shaft 6 being in the form of a planetary carrier of the planetary gear unit 4 and being coupled to an adjustable pump unit 3A of the variator 3. The second shaft 7 is a sun gear of the planetary gear unit 4 which is in active connection via spur gearing 8 with an adjustable motor unit 3B of the variator 3. The pump unit 3A and the motor unit 3B of the variator 3 designed as a hydrostatic device are in each case configured with an oblique axis and can be pivoted in the area of a pivot axis 11 by means of a common yoke 12.

The continuous drive unit 2 is coupled to a manual transmission unit 9 whose design depends on the power of the variator 3 and also on the design of the planetary gear unit 4. By means of the manual transmission unit 9 power is transferred from the continuous drive unit 2 toward a transmission output shaft 10. Furthermore, in the area of the manual transmission unit 9 the required drive output speeds in the various gear ratio ranges are obtained.

The manual transmission unit 9 is designed with four frictional shift elements S1 to S4, such that when the first shift element S1 is engaged, the driving range for reverse drive is engaged in the transmission device 1. The shift elements S2 to S4 are provided to produce the three driving ranges for forward drive.

A second sun gear 13 of the planetary gear unit 4 is connected to the transmission input shaft 5. Thus, the variator shafts 14 and 15 are respectively coupled to shafts 6, 7 of the planetary gear unit 4, which have no direct connection to the transmission input shaft 5. Moreover, the variator shafts 14 and 15 are arranged axis-parallel to the shafts 6, 7 of the planetary gear unit 4.

Figure 2:
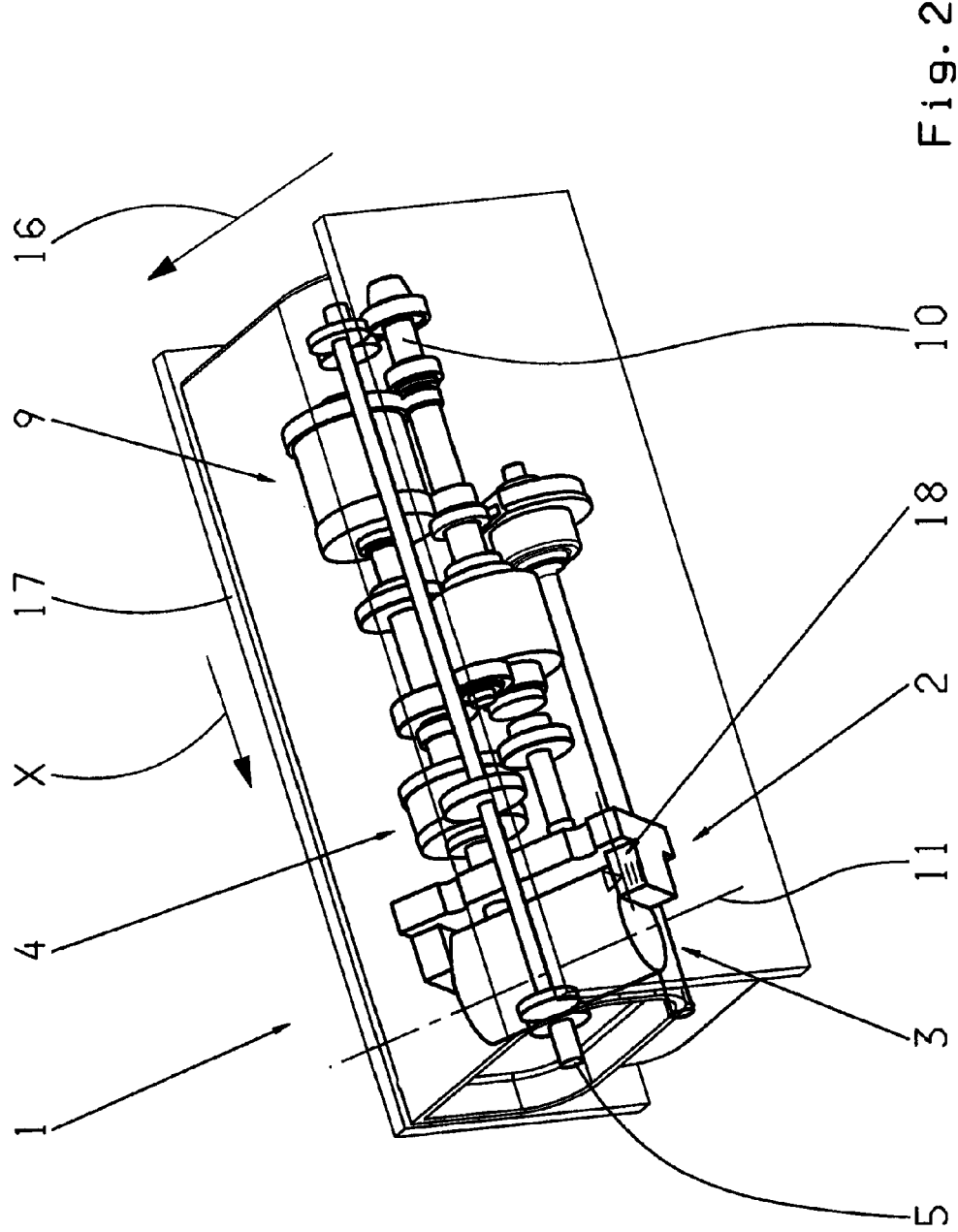
FIG. 2: Schematic three-dimensional side view of the transmission device according to FIG. 1.

The variator 3 is designed longer than it is wide and deep, and in its fitted position shown in FIG. 2 is arranged at least approximately diagonally in a vehicle frame 17. In this way the structural fitting space available, which is laterally restricted by the structure of the vehicle frame 17 and is also restricted upward in the direction of a vertical vehicle axis 16 and downward by the body structure of the vehicle and by a desired ground clearance, is used to the fullest extent for the fitting of the variator 3 and the transmission device 1.

Furthermore, the variator 3 is positioned ahead of the planetary gear unit 4 and the manual transmission unit 9, as viewed in the forward driving direction of the vehicle indicated by the arrow X in FIG. 2. The transmission device 1 is characterized on the one hand by restricted need for structural fitting space in the radial direction and on the other hand by greater axial length. Moreover, owing to its arrangement at the front in the forward driving direction X the variator 3 can be dismantled simply, so that depending on the design in each case, the variator 3 can be removed forward, or in relation to the top of the vehicle downward, or in the direction of the vehicle's vertical axis 16 upward out of the vehicle frame 17 which, besides other vehicle components, restricts the structural fitting space available in the vehicle for the transmission device 1.

If, as in the present case, the variator 3 is arranged at least partially below an oil level 18 in the transmission device 1, the variator 3 must be shielded by suitable partitioning elements from the hydraulic fluid present in an oil sump (not shown) of the transmission device 1, in order to avoid in a simple manner so-termed splashing losses during the operation of the transmission device 1 and consequent deterioration of the overall efficiency of the transmission device 1.

Figure 3:
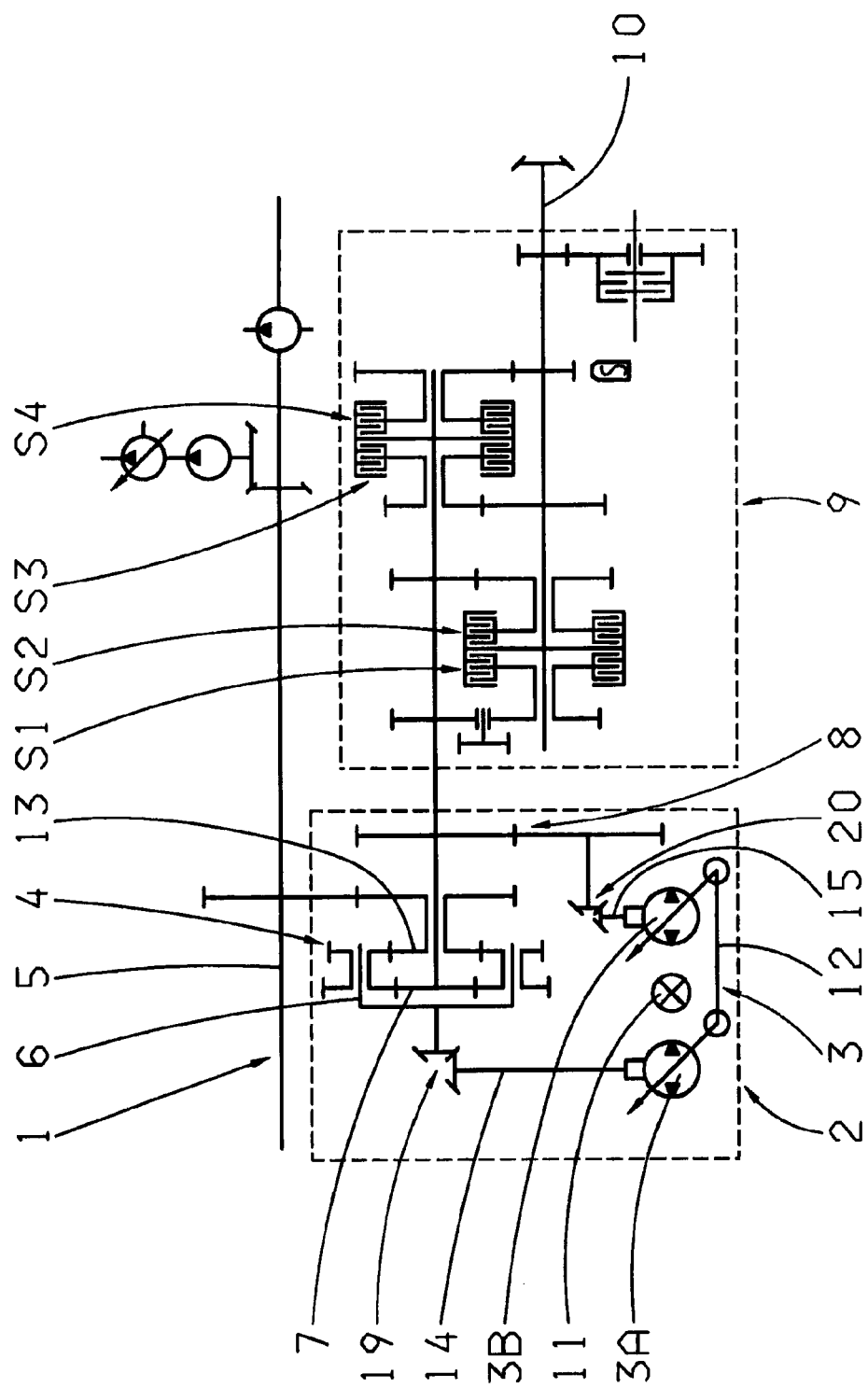
FIG. 3: Gearing layout of a second example embodiment of the transmission device according to the invention.

FIG. 3 shows a gearing layout of a second example embodiment of the transmission device 1, in which the two variator shafts 14 and 15 are respectively connected by so-termed angle drives 19 and 20 to the shafts 6 and 7 of the planetary gear unit 4, the angle drives 19, 20 being formed in each case by bevel gears or bevel gearing which mesh with one another. The variator shafts 14 and 15 are arranged perpendicularly to the shafts 6 and 7 of the planetary gear unit 4. In a simple manner, the connection of the variator 3 to the planetary gear unit 4 via the two angle drives 19 and 20 provides the possibility of arranging the variator 3 in the spatial positions shown in FIGS. 4 and 5.

Compared with the first example embodiment shown in FIGS. 1 and 2, in which the variator 3 is connected to the shafts 6, 7 of the planetary gear unit 4 by spur gearing, the second example embodiment of the transmission device 1 takes up less axial fitting space. In addition, for dismantling purposes the variator 3 can be pulled with little effort, laterally out of a plug connection and away from the bevel gearing of the angle drives 19 and 20, without having to previously dismantle other vehicle components.

Depending on the application in each case, it is however also possible to connect the variator in the arrangement shown in FIGS. 1 and 2 by means of angle drives to the planetary gear unit.

Figure 4:
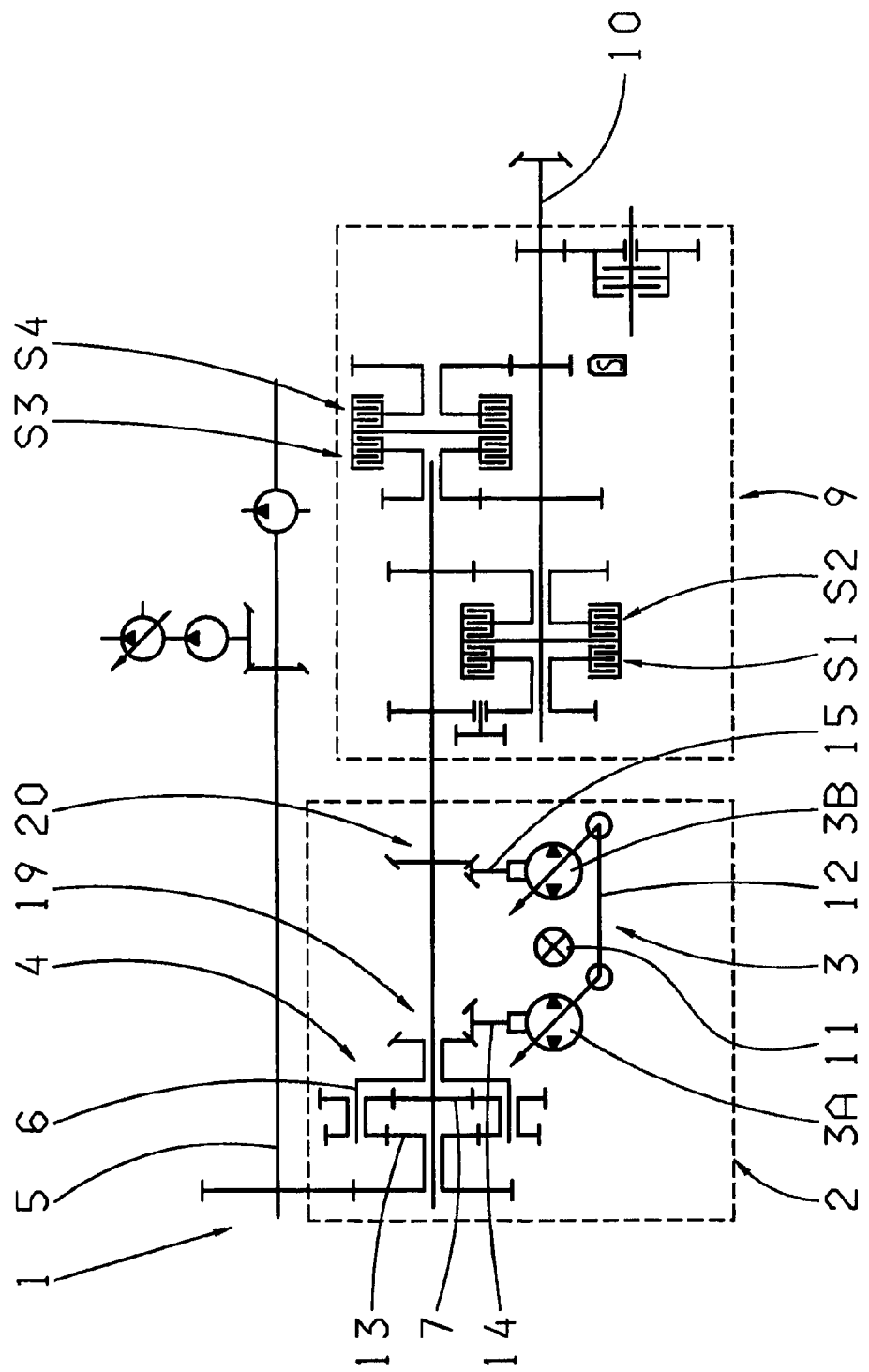
FIG. 4: Gearing layout of a third example embodiment of the transmission device according to the invention.
Figure 5:
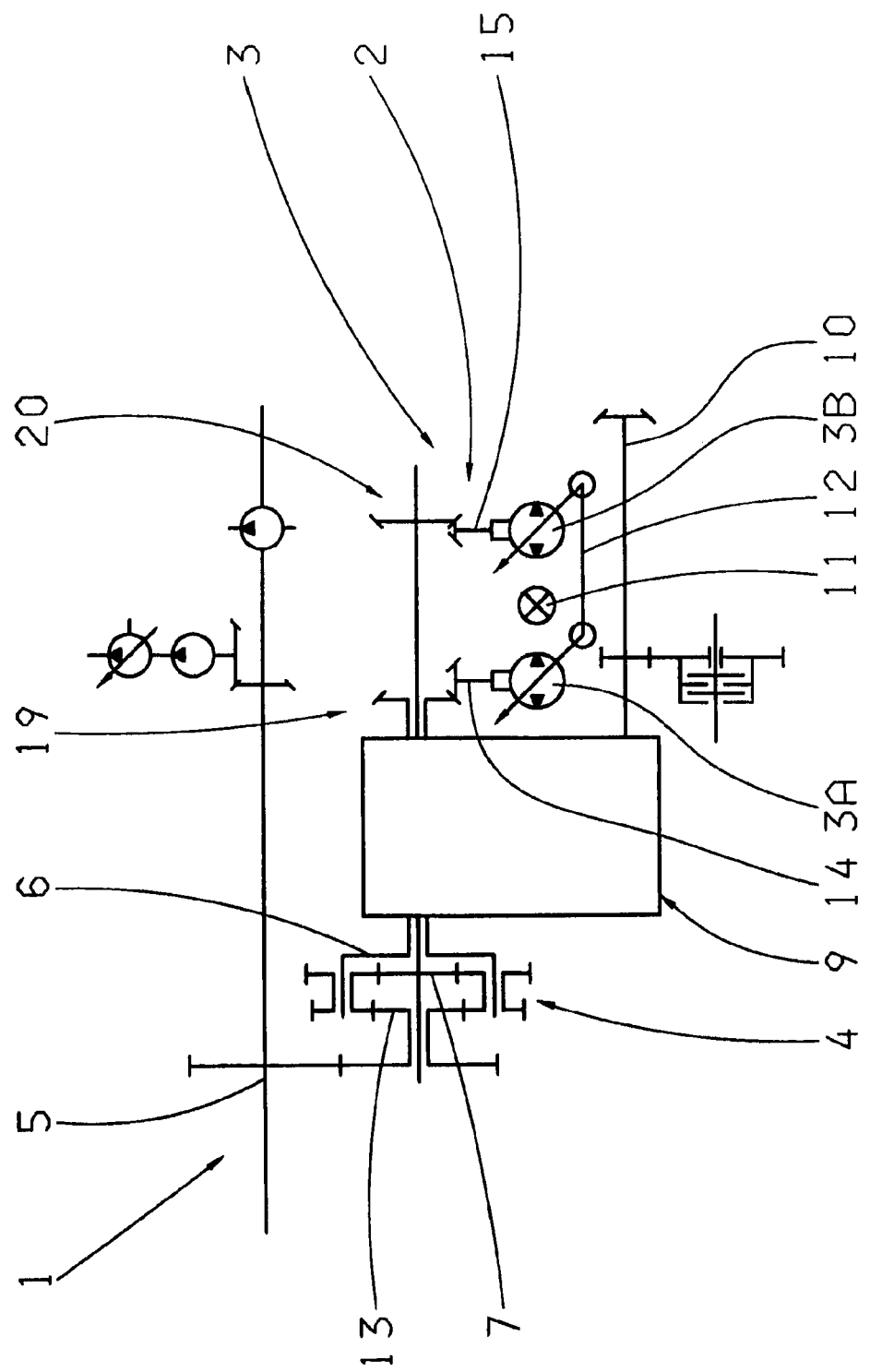
FIG. 5: Gearing layout of a fourth example embodiment of the transmission device according to the invention.

If insufficient fitting space is available for the variator 3 in the area of the transmission input, the variator 3 can be arranged, in the manner shown in FIG. 4, spatially between the planetary gear unit 4 and the manual transmission unit 9 with a diagonal orientation, or in the manner shown in FIG. 5, spatially behind the manual transmission unit 9 as viewed in the forward driving direction X so that the manual transmission unit 9 is positioned between the planetary gear unit 4 and the variator 3 and, in relation to a front axle of the vehicle, the transmission device 1 will then take up somewhat more radial fitting space in an area farther to the rear.

Figure 6:
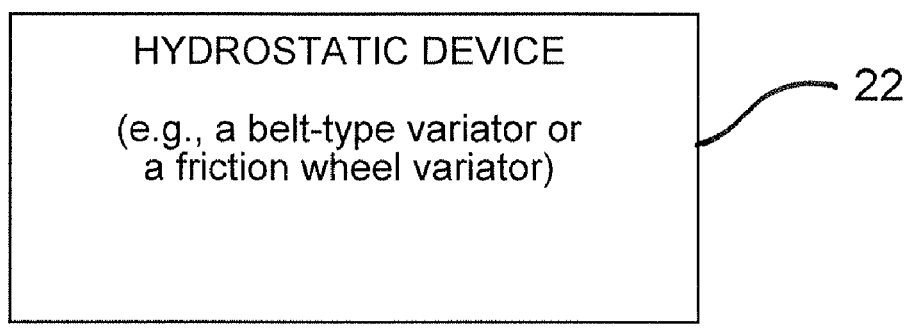
FIG. 6: A diagrammatic representation showing the hydrostatic device being one of a belt-type variator and a friction wheel variator.

Fundamentally, instead of a variator in the form of a hydrostatic device the power-branched transmission device can also be made with other suitable variators, such as a belt-type variator, a friction wheel variator or the like (all of which are diagrammatically shown as element 22 in FIG. 6), in order to be able to vary the gear ratio of the transmission device continuously and in an operating-condition-dependent manner to the desired extent.

Indexes

1 Transmission unit
  2 Continuously variable drive input
  3 Variator
  3A Pump device
  3B Motor device
  4 Planetary gear unit
  5 Transmission input shaft
  6 Shaft, planetary carrier
  7 Shaft, solar gear
  8 Spur gearing
  9 Manual transmission unit
  10 Transmission output shaft
  11 Pivot axis
  12 Yoke
  13 Second solar gear
  14, 15 Variator shaft
  16 Vertical axis of vehicle
  17 Vehicle frame
  18 Oil level
  19, 20 Angle drive
  S1 to S4 Shift element
  X Forward driving direction

The invention claimed is:

1. A vehicle with a vehicle frame (17) and a transmission unit (1) arranged on the vehicle frame (17), with a variator (3), a planetary gear unit (4) and a gearshift transmission unit (9) and the variator (3) being one of a hydrostatic device having a motor and a pump, a belt-type variator and a friction-wheel variator, and
  a length of the variator (3) being greater than a width and a depth of the variator (3),
  wherein the variator (3) is orientated, in an installed position, at least approximately diagonally with respect to a length of the vehicle frame (17) of the vehicle, and
  the variator is arranged above an oil level in an oil sump.

2. A vehicle with a vehicle frame (17) and a transmission unit (1) arranged on the vehicle frame (17), with a variator (3), a planetary gear unit (4) and a gearshift transmission unit (9) and the variator (3) being one of a hydrostatic device having a motor and a pump, a belt-type variator and a friction-wheel variator; and
  a length of the variator (3) being greater than a width and a depth of the variator (3);
  wherein the variator (3) is orientated, in an installed position, at least approximately diagonally with respect to a length of the vehicle frame (17) of the vehicle; and
  the variator (3) is arranged at least partially below an oil level (18) of an oil sump, and at least one partitioning element shields an area below the oil level (18) from hydraulic fluid.

3. The vehicle according to claim 1, wherein the variator (3) is a hydrostatic device.

4. The vehicle according to claim 3, wherein the hydrostatic device (3) is configured with inclined axes and comprises at least one adjustable unit (3A, 3B).

5. The vehicle according to claim 3, wherein the hydrostatic device (3) is configured with inclined disks and comprises at least one adjustable unit.

6. The vehicle according to claim 3, wherein the hydrostatic device comprises at least one constant unit.

7. The vehicle according to claim 3, wherein the hydrostatic device comprises at least one adjustable pump device and at least one adjustable motor device which are each adjustable independently of one another.

8. The vehicle according to claim 3, wherein the hydrostatic device (3) comprises at least one adjustable pump device (3A) and at least one adjustable motor device (3B) which are conjointly adjustable.

9. The vehicle according to claim 1, wherein the variator (3) is connected, in an area of a first shaft (14) and in an area of a second shaft (15), to respective shafts (6, 7) of the planetary gear unit (4) by angle drives (19, 20).

10. The vehicle according to claim 1, wherein, in an installed position, the variator (3) is arranged spatially between a drive machine of the vehicle and the planetary gear unit (4) and the gearshift transmission unit (9).

11. The vehicle according to claim 1, wherein the variator (3) is arranged spatially between the planetary gear unit (4) and the gearshift transmission unit (9).

12. A vehicle with a vehicle frame (17) and a transmission unit (1) arranged on the vehicle frame (17), with a variator (3), a planetary gear unit (4) and a gearshift transmission unit (9) and the variator (3) being one of a hydrostatic device having a motor and a pump, a belt-type variator and a friction-wheel variator; and
  a length of the variator (3) being greater than a width and a depth of the variator (3);
  wherein the variator (3) is orientated, in an installed position, at least approximately diagonally with respect to a length of the vehicle frame (17) of the vehicle; and
  the gearshift transmission unit (9) is arranged spatially between the planetary gear unit (4) and the variator (3).

* * * * *